United States Patent
Maeshima et al.

(10) Patent No.: US 9,147,896 B2
(45) Date of Patent: Sep. 29, 2015

(54) FUEL CELL SYSTEM COMPRISING AN ANODE PRESSURE CONTROLLER

(71) Applicant: Nissan Motor Co., Ltd., Yokohama, Kanagawa (JP)

(72) Inventors: Susumu Maeshima, Yokohama (JP); Keigo Ikezoe, Ayase (JP); Yasushi Ichikawa, Miura-gun (JP); Takahiro Fujii, Miura-gun (JP); Ryoichi Shimoi, Yokohama (JP); Taiji Nishiyama, Yokosuka (JP); Yusuke Ito, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 331 days.

(21) Appl. No.: 13/792,886

(22) Filed: Mar. 11, 2013

(65) Prior Publication Data

US 2013/0244127 A1 Sep. 19, 2013

(30) Foreign Application Priority Data

Mar. 15, 2012 (JP) ................................ 2012-059252

(51) Int. Cl.
*H01M 8/04* (2006.01)
*H01M 8/10* (2006.01)

(52) U.S. Cl.
CPC ...... *H01M 8/04089* (2013.01); *H01M 8/04552* (2013.01); *H01M 8/04634* (2013.01); *H01M 8/04753* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 8,080,342 B2 | 12/2011 | Tabuchi |
| 2005/0142400 A1 | 6/2005 | Turco et al. |
| 2009/0191437 A1* | 7/2009 | Maeshima et al. ............. 429/23 |
| 2011/0274998 A1 | 11/2011 | Ichikawa et al. |
| 2012/0107711 A1 | 5/2012 | Tomita et al. |
| 2012/0288776 A1* | 11/2012 | Nagaosa ...................... 429/423 |

FOREIGN PATENT DOCUMENTS

| JP | 2007-149630 A | 6/2007 |
| JP | 2007-517369 A | 6/2007 |
| JP | 2008-097966 A | 4/2008 |

\* cited by examiner

*Primary Examiner* — Ula C Ruddock
*Assistant Examiner* — Tony Chuo
(74) *Attorney, Agent, or Firm* — Global IP Counselors, LLP

(57) ABSTRACT

A fuel cell system is basically provided with a fuel cell, a pressure adjusting valve, a purge valve and an anode pressure controller. The fuel cell includes an anode that receives an anode gas and a cathode that receives a cathode gas to generate electric power corresponding to a load. The pressure adjusting valve is disposed in a supply path to adjust anode gas pressure to the anode. The purge valve is disposed in a discharging flow path to discharge an anode-off gas containing impurities from the fuel cell. The anode pressure controller is configured to control the pressure adjusting valve to perform a pulsation operation that pulsates the anode gas pressure of the fuel cell. The anode pressure controller decreases a median pressure of the pulsation operation as a wetness level of an electrolyte membrane of the fuel cell stack is determined to become higher.

18 Claims, 15 Drawing Sheets

FUEL CELL SYSTEM COMPRISING AN ANODE PRESSURE CONTROLLER

CROSS-REFERENCE TO RELATED APPLICATIONS

This application claims priority to Japanese Patent Application No. 2012-059252, filed on Mar. 15, 2012. The entire disclosure of Japanese Patent Application No. 2012-059252 is hereby incorporated herein by reference.

BACKGROUND

1. Field of the Invention

The present invention generally relates to a fuel cell system.

2. Background Information

Some conventional fuel cell systems are controlled such that the supply of the high-pressure anode gas fluctuates periodically between on and off states to cause the pressure of the anode gas to pulsate. An example of such a fuel cell system is disclosed in Japanese PCT National Stage Publication No. 2007-517369. Other examples of related types of fuel cell systems are disclosed in Japanese Laid-Open Patent Application No. 2007-149630 and Japanese Laid-Open Patent Application No. 2008-97966.

SUMMARY

For the conventional fuel cell system as that disclosed in Japanese PCT National Stage Publication No. 2007-517369, it has been discovered that when the pulsation operation is carried out, the quantity of the liquid water increases in the power generation region on the anode side of the fuel cell. When water exhaustion is to be accelerated, the water exhaustion may be insufficient even when the pulsation operation continues, so that supply of the fuel gas to the power generation region becomes insufficient, and the power generation may become poor.

The present invention attempts to solve the problems of the conventional fuel cell system by providing a fuel cell system in which it is still possible to accelerate the water exhaustion from the power generation region on the anode side of the fuel cell, while continuing the pulsation operation, even when the water generated in the power generation reaction leads to a high degree of wetness of the electrolyte membrane.

In view of the state of the known technology, one aspect of the present disclosure is to provide a fuel cell system comprises a fuel cell, a pressure adjusting valve, a purge valve and an anode pressure controller. The fuel cell includes an anode that receives an anode gas and a cathode that receives a cathode gas to generate electric power corresponding to a load. The pressure adjusting valve is disposed in a supply path to adjust anode gas pressure to the anode. The purge valve is disposed in a discharging flow path to discharge an anode-off gas containing impurities from the fuel cell. The anode pressure controller is configured to control the pressure adjusting valve to perform a pulsation operation that pulsates the anode gas pressure of the fuel cell. The anode pressure controller decreases a median pressure of the pulsation operation as a wetness level of an electrolyte membrane of the fuel cell stack is determined to become higher.

As a result of a fuel cell system of this configuration, as the wetness level of the electrolyte membrane increases, the median pressure of the pulsation is decreased to a lower level. As the median pressure is decreased, the relative gas density decreases, so that even with the same pulsation width, the flow rate of the anode gas is increased, and hence the liquid water can be discharged easily.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
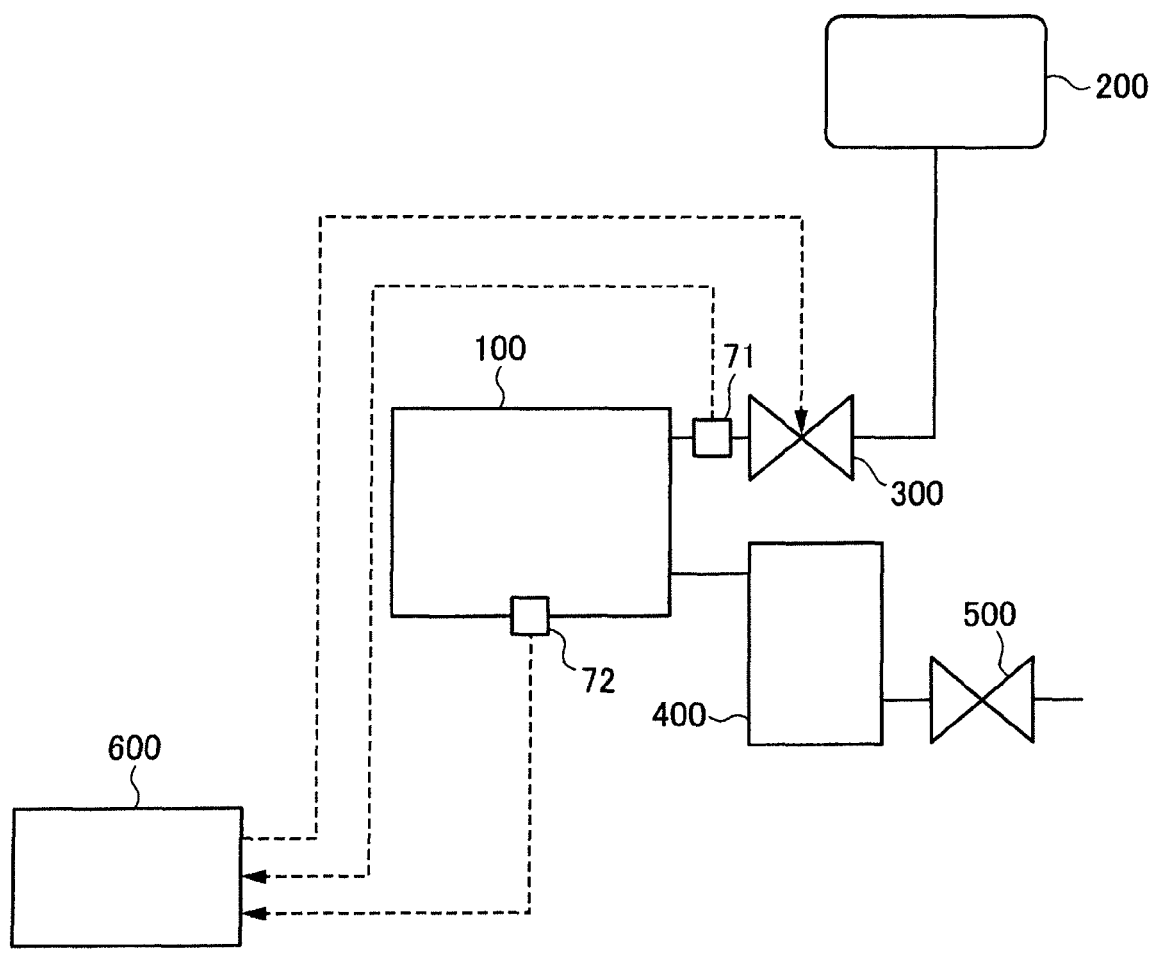
FIG. 1 is a schematic block diagram of a fuel cell system in accordance with a first embodiment.

Referring initially to FIG. 1, a fuel cell system is schematically illustrated in accordance with a first embodiment. Basically, the fuel cell system comprises a fuel cell stack 100, a hydrogen tank 200, a pressure adjusting valve 300, a buffer tank 400, a purge valve 500 and a controller 600.

The fuel cell stack 100 has reaction gases (an anode gas such as hydrogen and a cathode gas such as oxygen) that are supplied to the fuel cell stack 100 to generate electric power. The fuel cell stack 100 will be explained in more detail later.

The hydrogen tank 200 is a high-pressure gas tank that stores the anode gas $H_2$ at a high pressure. The hydrogen tank 200 is arranged on a most upstream side of the anode line.

The pressure adjusting valve 300 is arranged downstream from the hydrogen tank 200. The pressure adjusting valve 300 adjusts the pressure of the anode gas $H_2$ that is freshly supplied from the hydrogen tank 200 to the anode line. The pressure of the anode gas $H_2$ is adjusted by adjusting the opening degree of the pressure adjusting valve 300.

The buffer tank 400 is arranged downstream from the fuel cell stack 100. The buffer tank 400 stores the anode gas $H_2$ that is discharged from the fuel cell stack 100.

The purge valve 500 is arranged downstream from the buffer tank 400. As to be explained later, in the fuel cell stack 100, air (oxygen) is supplied in the cathode flow path as a cathode gas, while hydrogen is supplied in the anode flow path as an anode, gas. As a result, the power generation reaction takes place at the electrolyte membrane. In this case, a portion of the air supplied in the cathode flow path permeates through the electrolyte membrane and leaks into the anode flow path. In this case, the nitrogen $N_2$ in the air does not react, and the nitrogen stays in the buffer tank 400. As such, nitrogen $N_2$ flows back in the anode flow path of the fuel cell stack, the partial pressure of hydrogen decreases, and this hampers the power generation reaction. In this case, the purge valve 500 is opened at an appropriate time to purge the nitrogen $N_2$ together with the anode gas $H_2$.

The controller 600 controls the operation of the pressure adjusting valve 300 on based on various detection signals such as an anode pressure signal generated by a pressure sensor 71 that is arranged on the anode line, a current/voltage signal generated by a current/voltage sensor 72 that is arranged on the fuel cell stack 100, etc. The specific control contents will be described in more detail later.

Figure 2A:
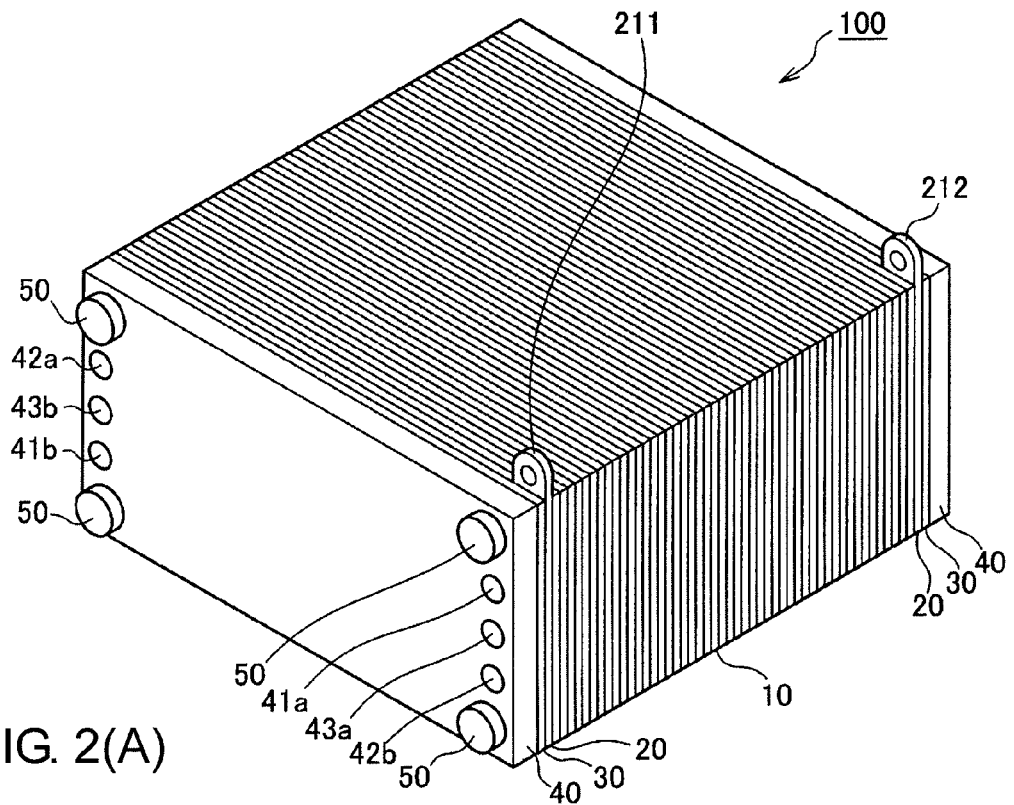
FIG. 2(A) is a perspective view of a fuel cell stack utilized in the fuel cell system illustrated in FIG. 1.
Figure 2B:
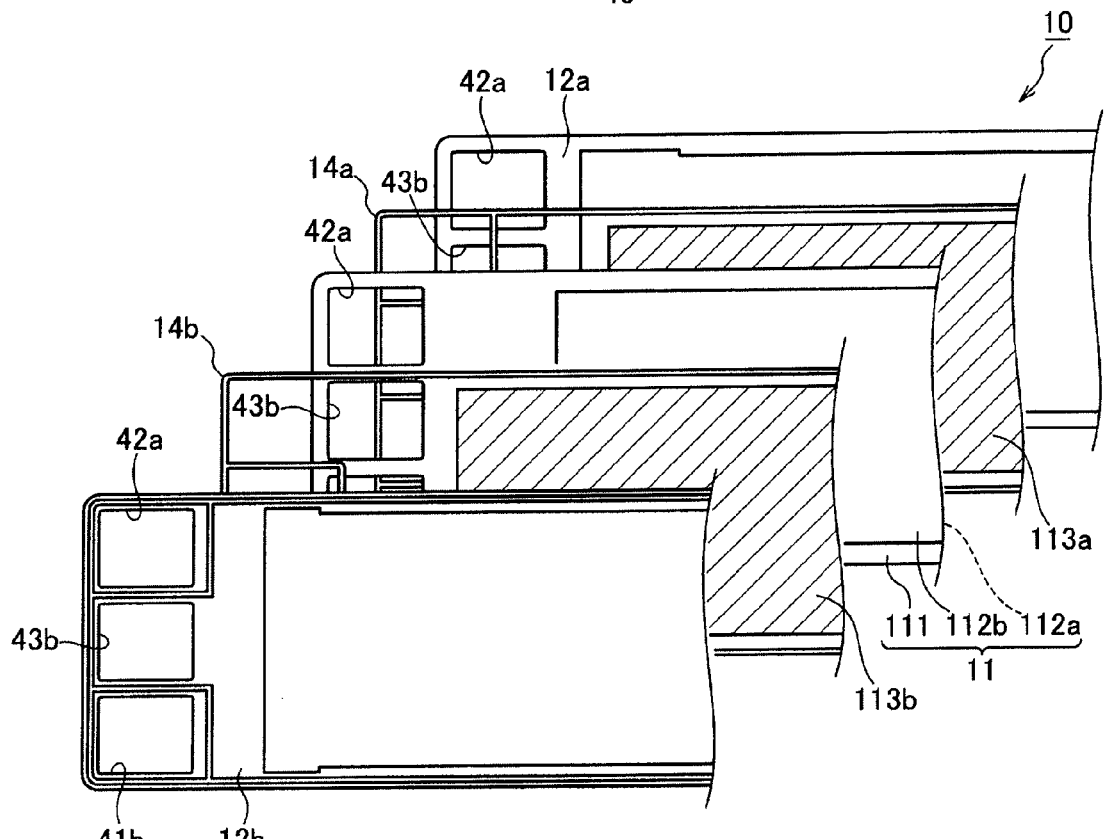
FIG. 2(B) is a partially exploded perspective view of the fuel cell stack illustrated in FIG. 2(A)

FIGS. 2(A) and 2(B) illustrate the fuel cell stack 100. FIG. 2(A) is a simplified perspective view of the fuel cell stack 100. FIG. 2(B) is a simplified exploded perspective view illustrating the structure of a power generation cell. As shown in FIG. 2(A), in the illustrated embodiment, the fuel cell stack 100 basically comprises a plurality of laminated power generation cells 10 (fuel cells), a plurality of collecting plates 20, a plurality of insulating plates 30, a plurality of end plates 40 and four tension rods 50. The power generation cells 10 are each a unit power generation cell of the fuel cell stack 100. Each of the power generation cells 10 can generate an electromotive force of about 1 V. Details of the configuration of each of the power generation cells 10 will be explained later.

The collecting plates 20 are arranged on the outer side of the laminated power generation cells 10, respectively. The collecting plates 20 are made of a gaseous non-permeable electroconductive material, such as the fine carbon. Each of the collecting plates 20 has a positive electrode terminal 211 and a negative electrode terminal 212. The fuel cell stack 100 uses the positive electrode terminal 211 and the negative electrode terminal 212 to procure and output the electrons e– generated by the power generation cells 10.

The insulating plates 30 are arranged on the outer side of the collecting plates 20, respectively. The insulating plates 30 are made of an insulating material, such as rubber or the like.

The end plates 40 are arranged on the outer side of the insulating plates 30, respectively. The end plates 40 are made of a rigid metal material, such as steel or the like.

An anode supply port 41a, an anode discharging port 41b, a cathode supply port 42a, a cathode discharging port 42b, a cooling water supply port 43a and a cooling water discharging port 43b are arranged on one of the end plates 40 (i.e., the end plate 40 on the left hand or front side in FIG. 2(A)). According to the present embodiment, the anode supply port 41a, the cooling water supply port 43a and the cathode discharging port 42b are arranged on the right hand side as shown in the drawing. On the other hand, the cathode supply port 42a, the cooling water discharging port 43b and the anode discharging port 41b are arranged on the left hand side as shown in the drawing.

The tension rods 50 are arranged near the four corners of the end plate 40, respectively. The fuel cell stack 100 has holes (not shown in the drawing) formed through the interior. In these through holes, the tension rods 50 are inserted, respectively. The tension rods 50 are made of a rigid metal material, such as steel or the like. In order to prevent an electric short circuit between the power generation cells 10, the tension rods 50 have their surfaces treated for insulation. Nuts (not shown in the drawing as they are in the depth) are screwed on the tension rods 50. The tension rods 50 and the nuts fasten the fuel cell stack 100 in the laminating direction.

Several methods can be utilized for supplying hydrogen as the anode gas to the anode supply port 41a. For example, a method can be used in which hydrogen gas is directly supplied from a hydrogen storage device to the anode supply port 41a. Alternatively, a method can be used in which a fuel containing hydrogen is modified and the modified hydrogen-containing gas is then supplied to the anode supply port 41a. Here, examples of hydrogen storage devices that may be used include a high-pressure gas tank, a liquefied hydrogen tank, a hydrogen adsorptive alloy tank, etc. Examples of the hydrogen-containing fuels include natural gas, methanol, gasoline, etc. As shown in FIG. 1, a high-pressure gas tank is used. Usually, air is used as the cathode gas that is supplied to the cathode supply port 42a.

As shown in FIG. 2(B), each of the power generation cells 10 has a membrane electrode assembly (MEA) 11 with an anode separator 12a (an anode bipolar plate) that is arranged on one surface and a cathode separator 12b (a cathode bipolar plate) that is arranged on the other surface. Here, the MEA 11 has electrode catalyst layers 112a and 112b made of an ion exchange membrane. The electrode catalyst layers 112a and 112b are formed on opposite surfaces of the electrolyte membrane 111. On the electrode catalyst layer layers 112a and 112b, a gas diffusion layer (GDL) 113a or 113b is formed. The electrode catalyst layers 112a and 112b are made of, for example, carbon black grains carrying platinum. The GDL 113a and 113b are made of a material with sufficient gas diffusion property and electroconductivity, such as carbon fibers.

The anode gas supplied from the anode supply port 41a flows through the GDL 113a and reacts with the anode electrode catalyst layer 112a, and the anode gas is then discharged from anode discharging port 41b. The cathode gas supplied from the cathode supply port 42a flows through the GDL 113b and reacts with the cathode electrode catalyst layer 112b, and the cathode gas is then discharged from the cathode discharging port 42b.

The anode separator 12a is superposed on one surface of the MEA 11 (the back surface shown in FIG. 2(B)) via the GDL 113a and the seal 14a. The cathode separator 12b is superposed on one surface (the outer surface shown in FIG. 2(B)) of the MEA 11 via the GDL 113b and the seal 14b. Here, the seals 14a and 14b are made of a rubber-like elastic material, such as silicone rubber, ethylene propylene rubber (ethylene propylene diene monomer: EPDM), fluororubber, etc. The anode separator 12a and the cathode separator 12b, for example, have a separator base made of stainless steel or another metal press formed, with the reaction gas flow paths formed on one surface and with the cooling water flow paths formed side by side and alternately with respect to the reaction gas flow paths. As shown in FIG. 2(B), the anode separator 12a and the cathode separator 12b are superposed on each other to form the cooling water flow paths.

On the MEA 11, the anode separator 12a and the cathode separator 12b, holes 41a, 41b, 42a, 42b, 43a and 43b are formed. They are superposed on the anode supply port 41a (the anode supply manifold), the anode discharging port 41b (the anode discharging manifold), the cathode supply port 42a (the anode supply manifold), the cathode discharging port 42b (the cathode discharging manifold), the cooling water supply port (the cooling water supply manifold) 43a and the cooling water discharging port 43b (the cooling water discharging manifold).

Figure 3A:
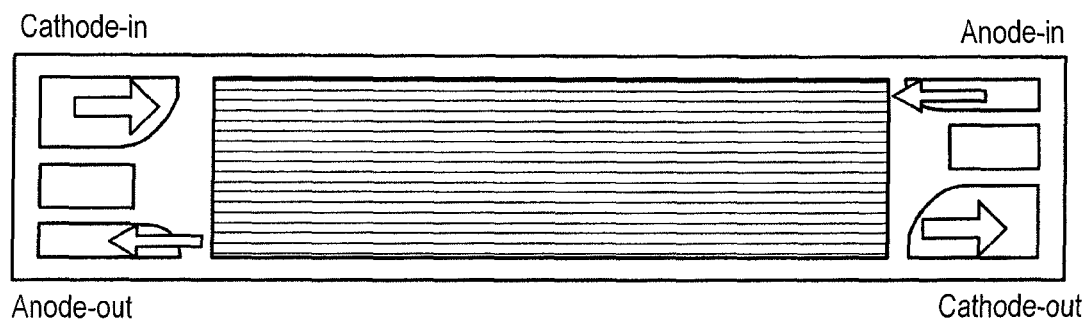
FIG. 3(A) is a schematic diagram illustrating a flow of gases in the fuel cell stack.

FIGS. 3(A) and (B) are schematic diagrams illustrating the reaction in the electrolyte membrane in the fuel cell stack.

As explained above, the fuel cell stack 100 has the reaction gases (the cathode gas $O_2$ and the anode gas $H_2$) supplied to the fuel cell stack to generate electric power. The fuel cell stack 100 has a configuration with hundreds of membrane electrode jointed members (membrane electrode assembly: MEA) each comprising a cathode electrode catalyst layer and an anode electrode catalyst layer formed on the two surfaces, respectively, laminated to each other. FIG. 3(A) shows one MEA among them. Here, in this example, the cathode gas is supplied to the MEA (cathode-in), and the cathode is discharged from the diagonal side (the cathode-out), and the anode gas is supplied (the anode-in), and the anode gas is discharged from the diagonal side (the anode-out).

At each membrane electrode assembly (MEA), the following reactions take place corresponding to the load to generate the electric power in the cathode electrode catalyst layer and the anode electrode catalyst layer.

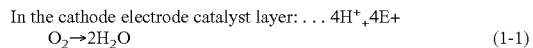

In the cathode electrode catalyst layer: ... $4H^+ + 4E +$
$O_2 \rightarrow 2H_2O$ (1-1)

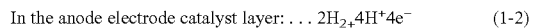

In the anode electrode catalyst layer: ... $2H_2 + 4H^+ 4e^-$ (1-2)

Figure 3B:
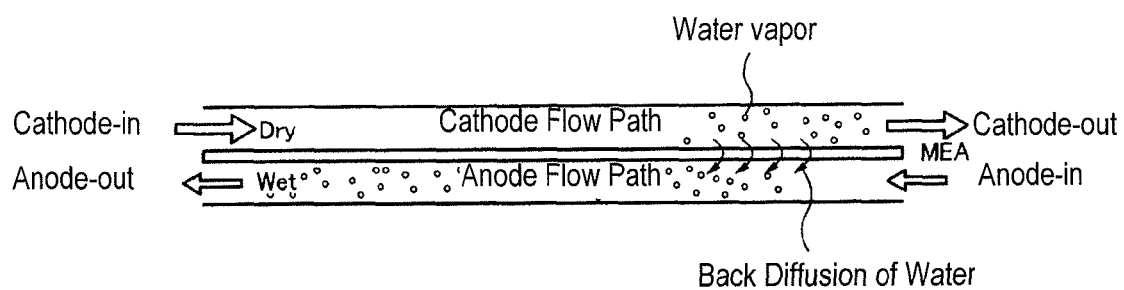
FIG. 3(B) is a schematic diagram illustrating the reaction at the electrolyte membrane in the fuel cell stack.

As shown in FIG. 3(B), as the reaction gas (the cathode gas $O_2$) flows through the cathode flow path, the reaction represented by the above-listed equation (1-1) takes place to generate water vapor. As a result, the relative temperature on the downstream side of the cathode flow path becomes higher. Consequently, the difference in the relative humidity between the cathode side and the anode side increases. With this difference in the relative humidity as a driving force, the water diffuses back, so that the upstream side of the anode is humidified. The water content then is further evaporated in the anode flow path to humidify the reaction gas (the anode gas $H_2$) flowing in the anode flow path. The water content is then carried to the downstream side of the anode and humidifies the MEA downstream from the anode.

In order to generate electric power at a high degree of efficiency with the above-listed reactions, the electrolyte membrane should be appropriately wet. However, if there is too much water content in the electrolyte membrane, the excessive water content overflows to the reaction gas flow path and hampers the gas flow.

The cathode flow path is opened to the atmosphere. Consequently, the water content in the cathode flow path is discharged together with the cathode gas to the atmosphere. However, as explained above, the purge valve 500 is arranged on the anode flow path. Usually, the purge valve 500 is turned off, and the on/off of the high-pressure anode gas is carried out repeatedly. Consequently, the water content in the anode flow path can be hard to discharge.

Here, in order to exhaust the water content in the anode flow path, the purge valve 500 can be turned on to purge the water content so as to accelerate the flow of the anode gas. However, when purging is carried out, the unreacted anode gas $H_2$ is also discharged. Consequently, less purging of the anode gas is preferred.

Figure 4:
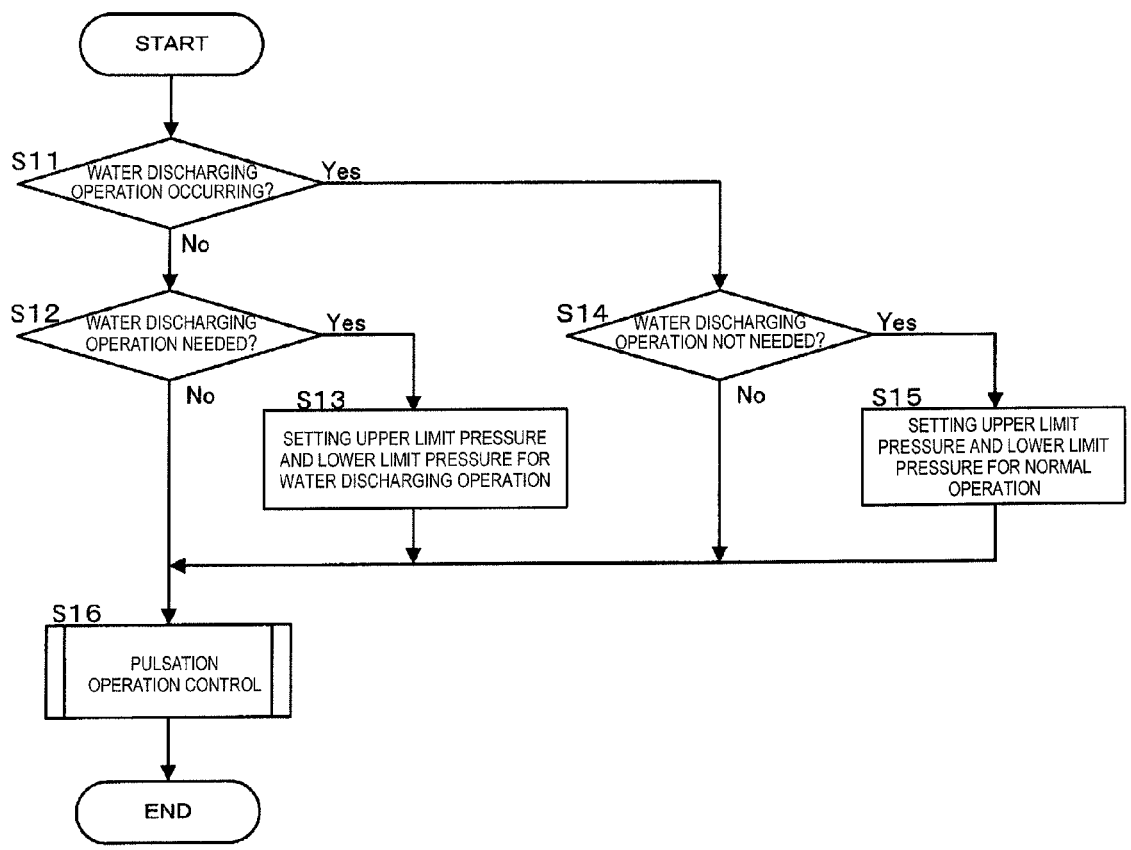
FIG. 4 is a control flow chart illustrating a process executed by the controller of the fuel cell system in accordance with the first embodiment.

FIG. 4 is a flow chart illustrating the control executed by the controller 600 in the first embodiment of the fuel cell system 100. Here, the controller 600 repeatedly executes this flow chart of control at a specified interval (e.g., 10 msec). The controller 600 constitutes an anode pressure controller that is a configured to control the pressure adjusting valve 300 to perform a pulsation operation that pulsates the anode gas pressure of the power generation cells 10 (the fuel cells) of the fuel cell stack 100.

In step S11, the controller 600 determines whether a water discharging operation is occurring. If the determination is NO, then the process proceeds to step S12. If the determination is YES, the process proceeds to step S14.

Figure 5:
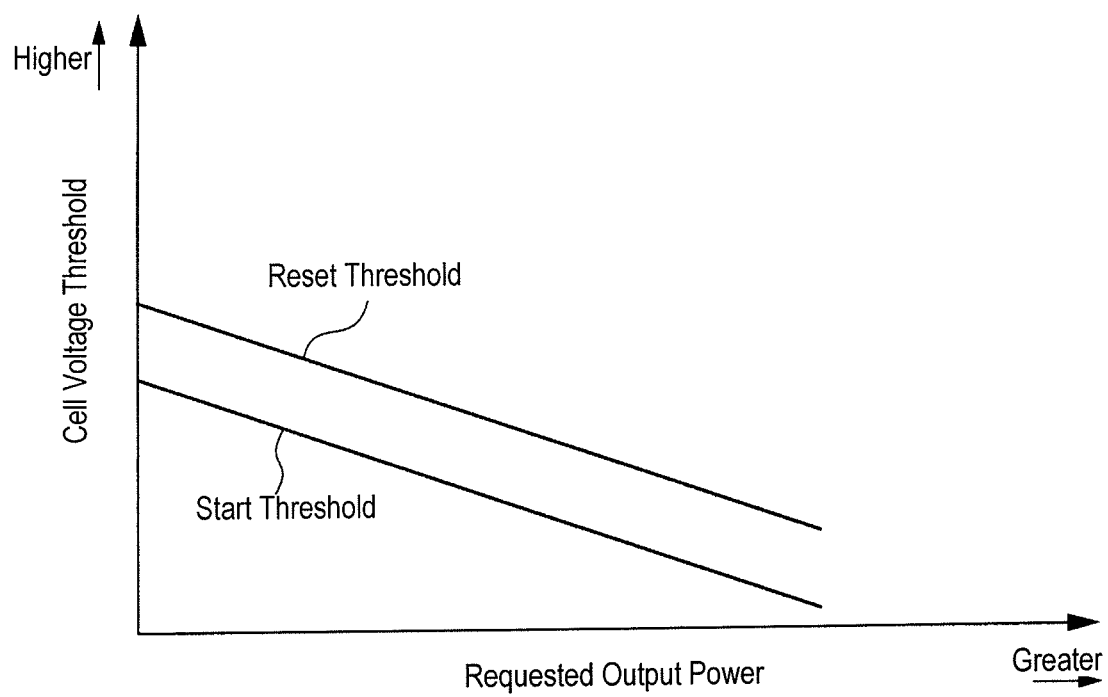
FIG. 5 is a graph illustrating an example of the map for determining a cell voltage threshold for a requested output power (a requested load)

In step S12, the controller 600 determines whether carrying out the water discharging operation is necessary. More specifically, a map as that shown in FIG. 5 is prepared in advance by experimentation or the like, and the requested load is applied on the map to determine the threshold of the cell voltage. Then, if the cell voltage is lower than the cell voltage threshold, a determination is made that the water discharging operation is needed. If the determination is YES, then the controller 600 goes to step S13. If the determination is NO, the process proceeds to step S16.

Also, a determination can be made regarding whether carrying out the water discharging operation according to the wetness level of the electrolyte membrane of the fuel cell stack is necessary. That is, when the electrolyte membrane of the fuel cell stack is very wet (that is, when the electrolyte membrane contains a lot of water), a determination is made that the water discharging operation should be carried out. The wetness level of the electrolyte membrane can be determined from the impedance (the internal resistance) of the electrolyte membrane. That is, if the electrolyte membrane is less wet (the water content in the electrolyte membrane is lower, and the electrolyte member looks drier), the impedance is higher. On the contrary, if the electrolyte membrane is less wet (the water content in the electrolyte membrane is higher, and the electrolyte member looks wetter), the impedance is lower. By exploiting this characteristic feature, for example, the power generation current of the fuel cell stack is made to vary as the 1-kHz sinusoidal wave, and the variation in the voltage is checked. Then, the amplitude of the 1-kHz AC voltage is divided by the amplitude of the AC current to determine the impedance. Then, on the basis of the determined impedance, the wetness level of the electrolyte membrane can be determined. If the wetness level determined in this way is greater than the reference wetness level, a determination is made that the water discharging operation should be carried out.

In step S13, the controller 600 sets a target upper limit pressure and a target lower limit pressure of the pulsation operation of the anode gas for performing a water discharging operation. Thus, the controller 600 decreasing a median pressure of the pulsation operation as a wetness level of the electrolyte membrane of the fuel cell stack 100 is determined to become higher than a prescribed wetness level. The specifics of this pulsation operation of the anode gas will be explained in detail later.

In step S14, the controller 600 determines whether the water discharging operation is needed. More specifically, a determination opposite to that made in step S12 is made. The threshold for making such a determination may be the same as the threshold for the determination regarding whether the water discharging operation is needed in step S12. Alternatively, in step S14, the threshold can be a different threshold as indicated by a reset threshold shown in FIG. 5. If the determination is YES, the process proceeds to step S15. If the determination is NO, the process proceeds to step S16.

Figure 6:
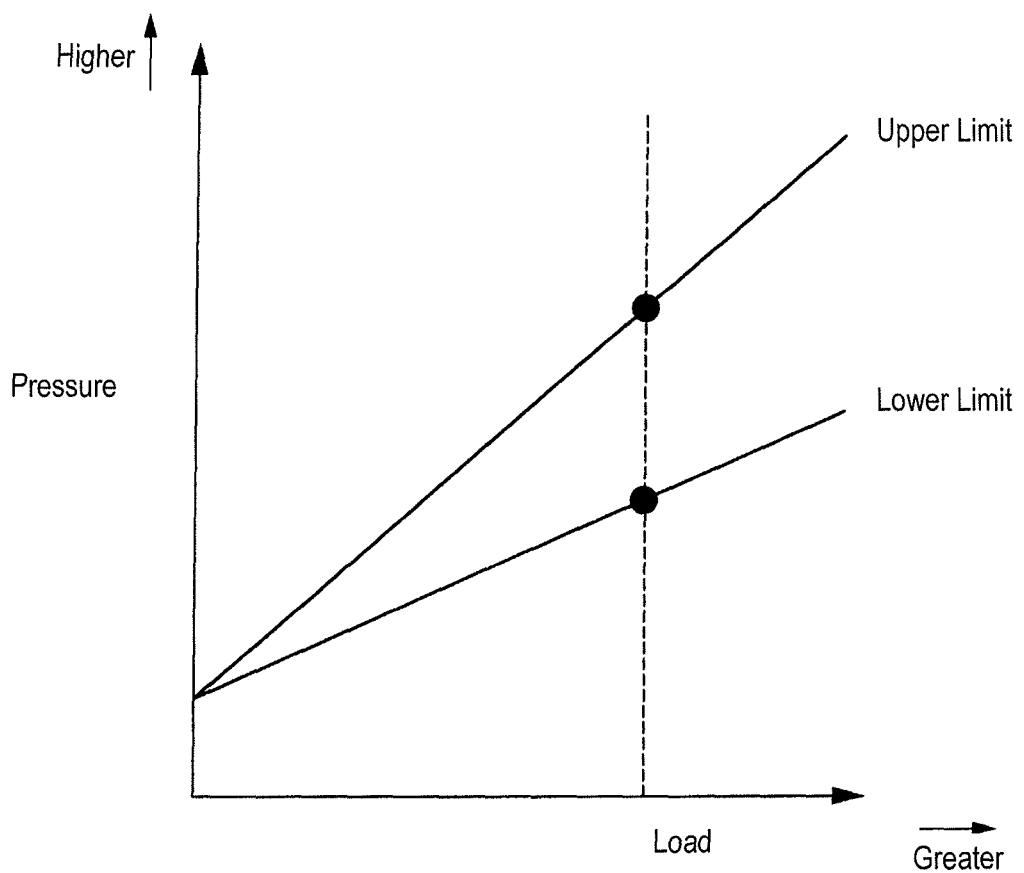
FIG. 6 is a graph illustrating an example of a map for setting a target upper limit pressure and a target lower limit pressure in the pulsation operation of the reaction gas.

In step S15, the controller 600 sets the target upper limit pressure and the target lower limit pressure of the pulsation operation of the anode gas. More specifically, as shown in FIG. 6, a map is prepared in advance by experimentation or the like. Then, the target requested load is applied on the map, and the target upper limit pressure and the target lower limit pressure of the pulsation operation of the anode gas for the normal operation are set.

In addition, the target upper limit pressure and the target lower limit pressure for the water discharging operation set in step S13 can be determined by subtracting a decreasing magnitude amount from the target upper limit pressure and the target lower limit pressure for the normal operation. The decreasing magnitude amount can be determined based on a hydrogen concentration of the buffer tank 400 by using the map shown in FIG. 7. Thus, the pressure differential amount for the water discharging operation is the same as the pressure differential amount for the normal operation.

Figure 7:
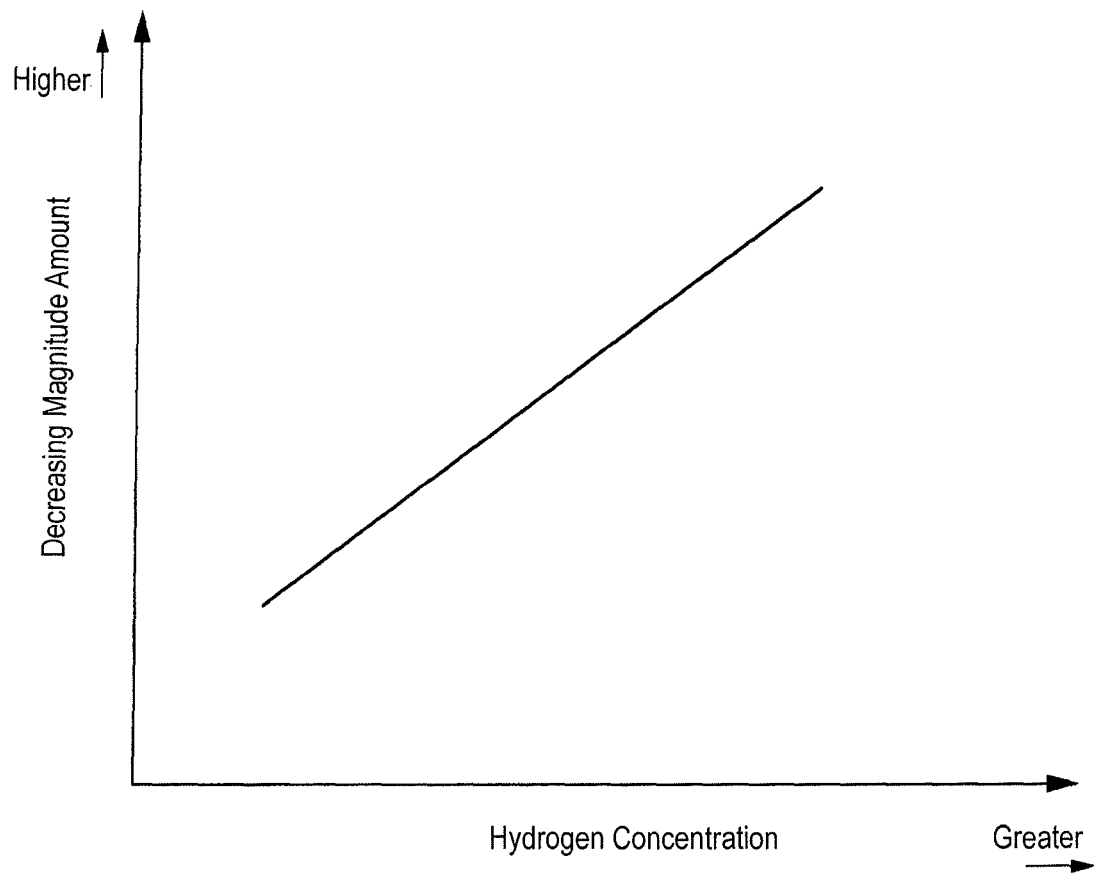
FIG. 7 is a graph illustrating an example of a map for determining a decreasing magnitude amount for a target pressure in an water exhaustion operation from the hydrogen concentration.

As can be seen from FIG. 7, the decreasing magnitude amount is larger when the hydrogen concentration in the buffer tank 400 is higher. Here, the hydrogen concentration may be detected by, for example, a hydrogen sensor. Usually, in a high-load operation, if the hydrogen concentration is over 90%, the concentration is taken as a high concentration. On the other hand, in a low-load operation, if the hydrogen concentration is over 80%, the concentration is taken as a high concentration. Consequently, it is possible to determine the hydrogen concentration corresponding to the operation load. In addition, as the hydrogen concentration increases right after purging, one may determine the hydrogen concentration in consideration of the time lapsed after purging.

In step S16, the controller 600 controls the pulsation operation of the anode gas. The specifics of the pulsation operation of the anode gas will be explained in detail later.

Figure 8:
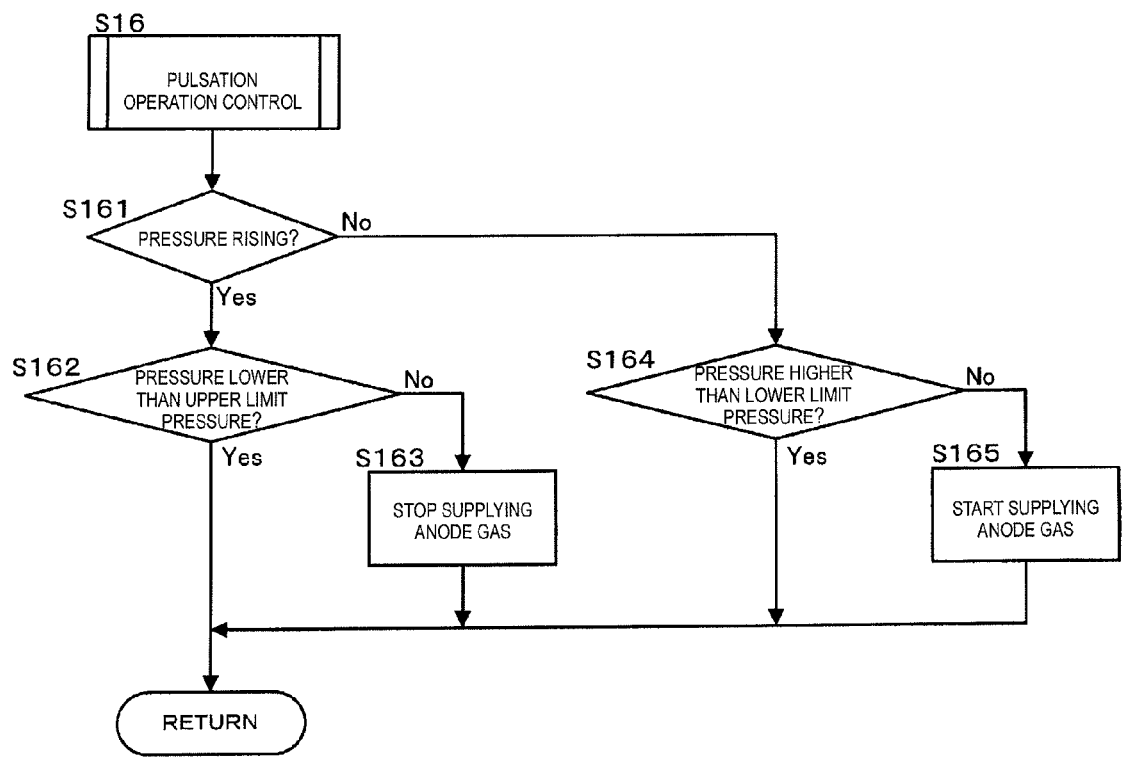
FIG. 8 is a flow chart illustrating a pulsation operation routine of the control flow chart of FIG. 4 that is the executed by the controller of the fuel cell system.

FIG. 8 is a flow chart illustrating the pulsation operation routine.

In step S161, the controller 600 determines whether the pressure is increasing (rising) at the moment. If the determination is YES, then the process proceeds to step S162. If the determination is NO, the process proceeds to step S164.

In step S162, the controller 600 determines whether the current pressure is lower than the target upper limit pressure. If the determination is YES, then the process returns to step S161. If the determination is NO, then the process proceeds to step S163.

In step S163, the controller 600 turns off the supply of the anode gas to decrease the pressure of the anode gas.

In step S164, the controller 600 determines whether the current pressure is above the target lower limit pressure. If the determination is YES, then the process returns to step S161. If the determination is NO, then the process proceeds to step S165.

In step S165, the controller 600 starts the supply of the anode gas to increase the pressure of the anode gas.

Figure 9:
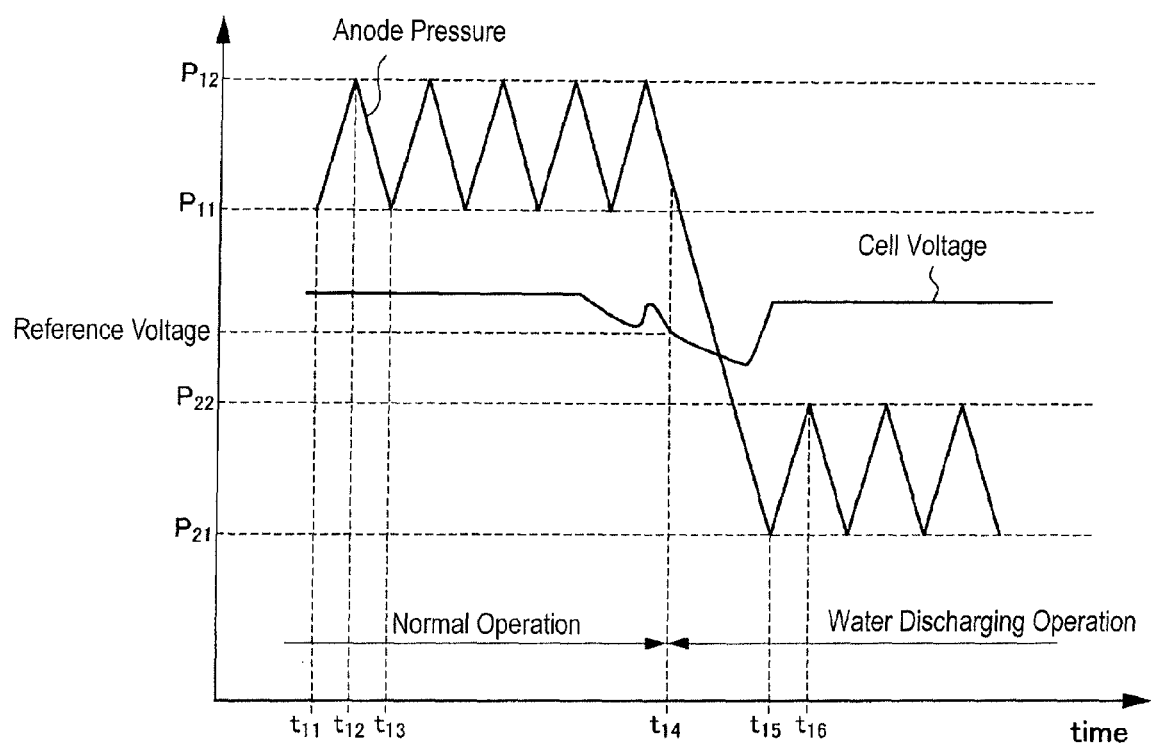
FIG. 9 is a timing chart illustrating the operation when the control flow chart is executed in accordance with the first embodiment.
Figure 10:
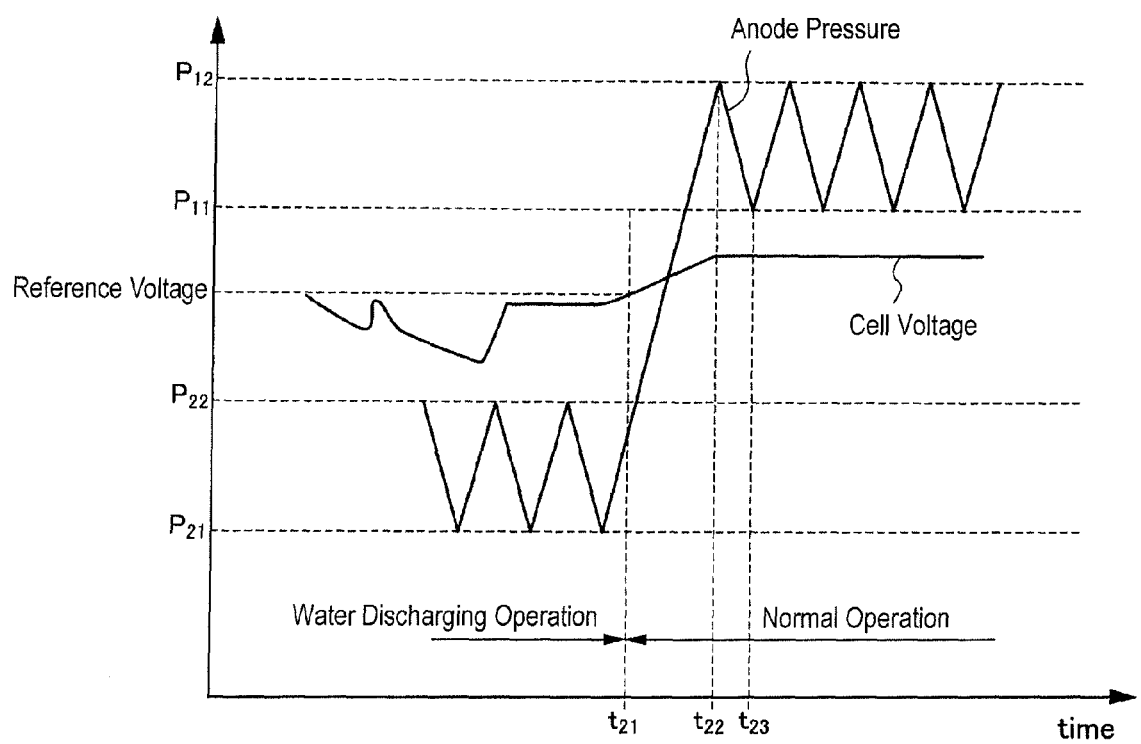
FIG. 10 is a timing chart illustrating the operation when the control flow chart is executed in the first embodiment.

FIGS. 9 and 10 are timing charts illustrating the operation when the control flow chart in the first embodiment is executed. The following operation is carried out when the control flow chart described above is executed. As shown in FIG. 9, before the time $t_{11}$, based on the target requested load, the target lower limit pressure $P_{11}$ and the target upper limit pressure $P_{12}$ are set for the pulsation operation of the anode gas.

After the time $t_{11}$, the control operation with the following steps is carried out repeatedly: steps S11→S12→S16→S161→S162. As a result, as shown in FIG. 9, the anode pressure increases.

If the target upper limit pressure $P_{12}$ is reached at the time $t_{12}$, the operation is carried out as steps S162→S163. As a result, as shown in FIG. 9, the anode pressure is decreased. After the time $t_{12}$, the operation with the following steps is carried out repeatedly: steps S11→S12→S16→S161→S164. Because the anode gas is consumed due to the power generation reaction even during the period when the supply of the anode gas is turned off, as shown in FIG. 9, the anode pressure decreases.

If the target lower limit pressure $P_{11}$ is reached at the point $t_{13}$, the operation is carried out as steps S164→S165. As a result, as shown in FIG. 9, the anode pressure increases.

The same control as described above is carried out repeatedly until the time $t_{14}$.

At the time $t_{14}$, if the cell voltage becomes lower than the threshold, the operation of steps S12→S13 is carried out, and the target upper limit pressure $P_{22}$ and the target lower limit pressure $P_{21}$ of the anode pulsation for the water discharging operation are set. Then, the anode gas is supplied in pulsation so that the target upper limit pressure $P_{22}$ and the target lower limit pressure $P_{21}$ are reached.

After the time t14, the operation of steps S11→S14→S16→S161→S164 is carried out repeatedly. Because the anode gas is consumed due to the power generation reaction even during the period when the supply of the anode gas is turned off, as shown in FIG. 9, the anode pressure keeps decreasing. Here, as the purge valve 500 is controlled so that the purge rate is higher than that in the normal operation, the anode pressure decreases quickly. Also, it is possible to reliably prevent the backflow of the nitrogen $N_2$ from the buffer tank 400.

At the time $t_{15}$, if the target lower limit pressure $P_{21}$ is reached, the operation of steps S164→S165 is carried out. As a result, as shown in FIG. 9, the anode pressure increases.

After the time $t_{15}$, the operation of steps S11→S14→S16→S161→S162 is carried out repeatedly. As a result, as shown in FIG. 9, the anode pressure increases.

At the time $t_{16}$, if the target upper limit pressure $P_{22}$ is reached, the operation of steps S162→S163 is carried out. As a result, the anode pressure decreases as shown in FIG. 9.

After the time t16, the operation of step S11→S14→S16→S161→S164 is carried out repeatedly. Because the anode gas is consumed due to the power generation reaction even during the period when the supply of the anode gas is turned off, as shown in FIG. 9, the anode pressure keeps decreasing.

After that, the same control as described above is carried out repeatedly.

At the time $t_{21}$ shown in FIG. 10, if the cell voltage becomes higher than the threshold, the operation of step S14→S15 is carried out, and the target upper limit pressure $P_{12}$ and the target lower limit pressure $P_{11}$ of the anode pulsation for the normal operation are set. Then, the anode gas is supplied in pulsation so that the target upper limit pressure $P_{12}$ and the target lower limit pressure $P_{11}$ are reached.

After the time $t_{21}$, the operation of steps S11→S12→S16→S161→S162 is carried out repeatedly. As a result, the anode pressure increases as shown in FIG. 10.

At the time $t_{22}$, if the target upper limit pressure $P_{12}$ is reached, the operation of steps S162→S163 is carried out. As a result, as shown in FIG. 10, the anode pressure decreases.

After the time $t_{22}$, the operation of steps S11→S12→S16→S161→S164 is carried out repeatedly. Because the anode gas is consumed due to the power generation reaction even during the period when the supply of the anode gas is turned off, as shown in FIG. 10, the anode pressure keeps decreasing.

At the time $t_{23}$, if the anode pressure reaches the target lower limit pressure $P_{11}$, the operation of steps S164→S165 is carried out. As a result, as shown in FIG. 10, the anode pressure increases.

After that, the same control as described above is carried out repeatedly.

The fuel cell system in the present embodiment is a fuel cell system with the anode gas supplied in pulsation. According to the present embodiment, when removing the water content from the anode flow path is necessary, the pulsation pressure decreases. As the supply pressure of the anode gas decreases, for the same pulsation amplitude, the flow rate by volume increases. Consequently, as the supply pressure decreases, the flow rate of the anode gas increases when the anode gas is supplied in pulsation. As a result, exhausting the water becomes easier.

Figure 11:
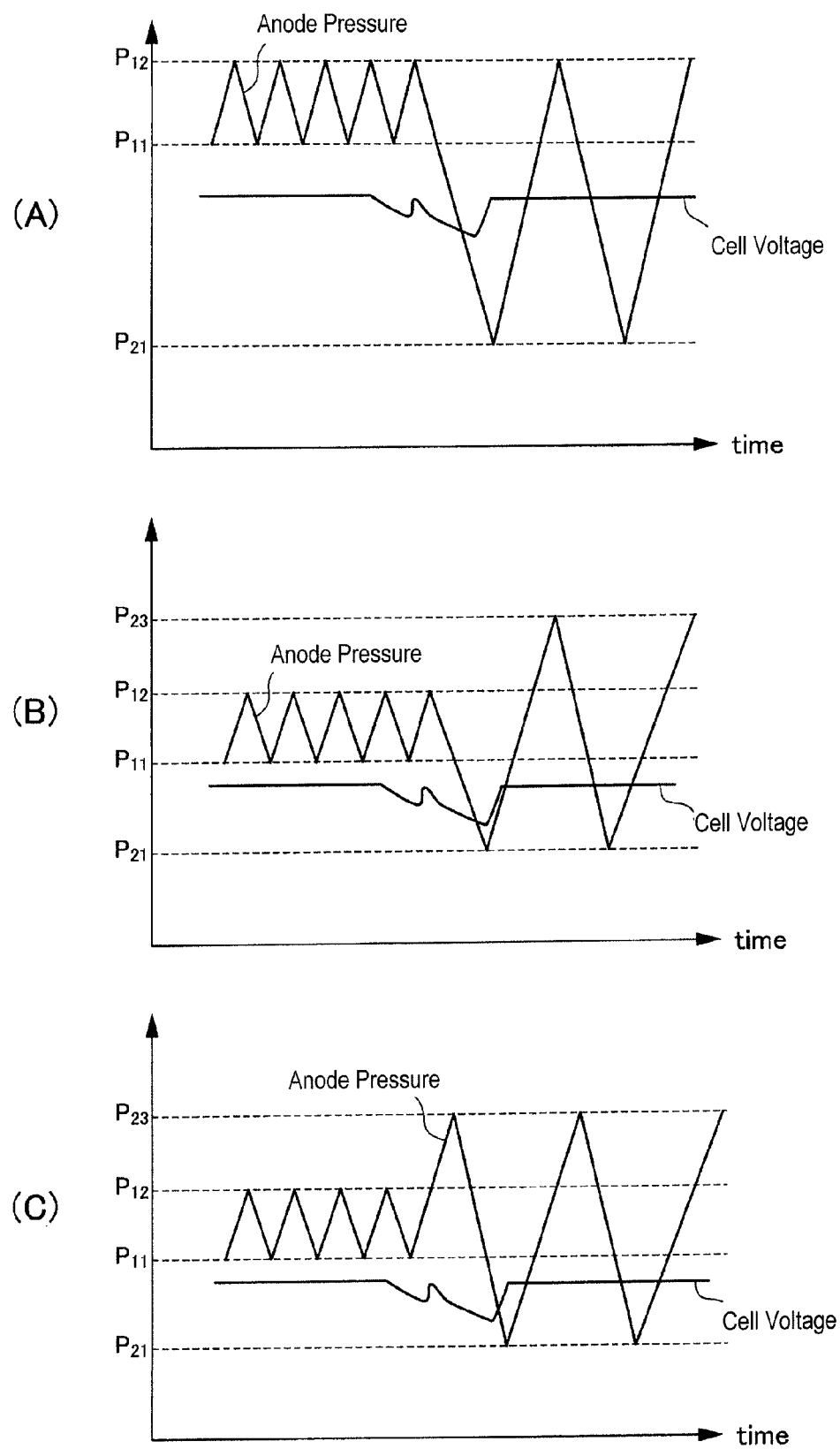
FIG. 11 is a diagram illustrating a modified example of the first embodiment.

In addition, for the pulsation pressure, especially when the lower limit pressure is decreased, the flow rate of the anode gas increases, and exhausting the water becomes easier. Consequently, as shown in portion (A) of FIG. 11, as the target pressure for the water discharging operation, instead of changing the target upper limit pressure $P_{12}$, one may also set another target lower limit pressure $P_{21}$ lower than the target lower limit pressure $P_{11}$. As shown in portions (B) and (C) of FIG. 11, while the target lower limit pressure $P_{21}$ is set lower than the target lower limit pressure $P_{11}$, the target upper limit pressure $P_{23}$ is also set higher than the target upper limit pressure $P_{12}$. In this way, the water discharging effect can be realized.

In addition, according to the present embodiment, when the lower limit pressure of the pulsation operation of the anode gas is decreased, if there is no need to carry out the water discharging operation, the decreased lower limit is reset. As the pulsation pressure is decreased, the output power also decreases. Now, according to the first embodiment, when there is no need to carry out the water discharging operation, the decreased lower limit pressure is reset, so that it is possible to keep the decrease in the output power within the smallest possible range.

In addition, as a determination is made regarding whether carrying out the water discharging operation according to the cell voltage is necessary, a determination can be made easily. In addition, when a determination is made on the basis of the wetness (impedance) of the electrolyte membrane, it is possible to make the determination with a high degree of precision.

In addition, when the process proceeds to the step of water discharging operation, the purge valve 500 is controlled so that the purge rate is greater than that of the normal operation and so that the anode pressure decreases quickly. As a result, it is possible to reliably prevent the backflow of the nitrogen $N_2$ from the buffer tank 400.

In addition, according to the present embodiment, the target pressure of the water discharging operation is set corresponding to the hydrogen concentration. Here, the higher the hydrogen concentration is, the lower the pressure of the water discharging operation is set. When the hydrogen concentration is higher, even when the pressure of the water discharging operation decreases, the backflow of the nitrogen $N_2$ can still hardly take place from the buffer tank 400.

Consequently, it is possible to decrease the pressure of the water discharging operation. By setting a lower target pressure for the water discharging operation, increasing the flow rate of the anode gas when the anode gas is supplied in pulsation mode is easy, and carrying out the water discharging operation is easy.

Figure 12:
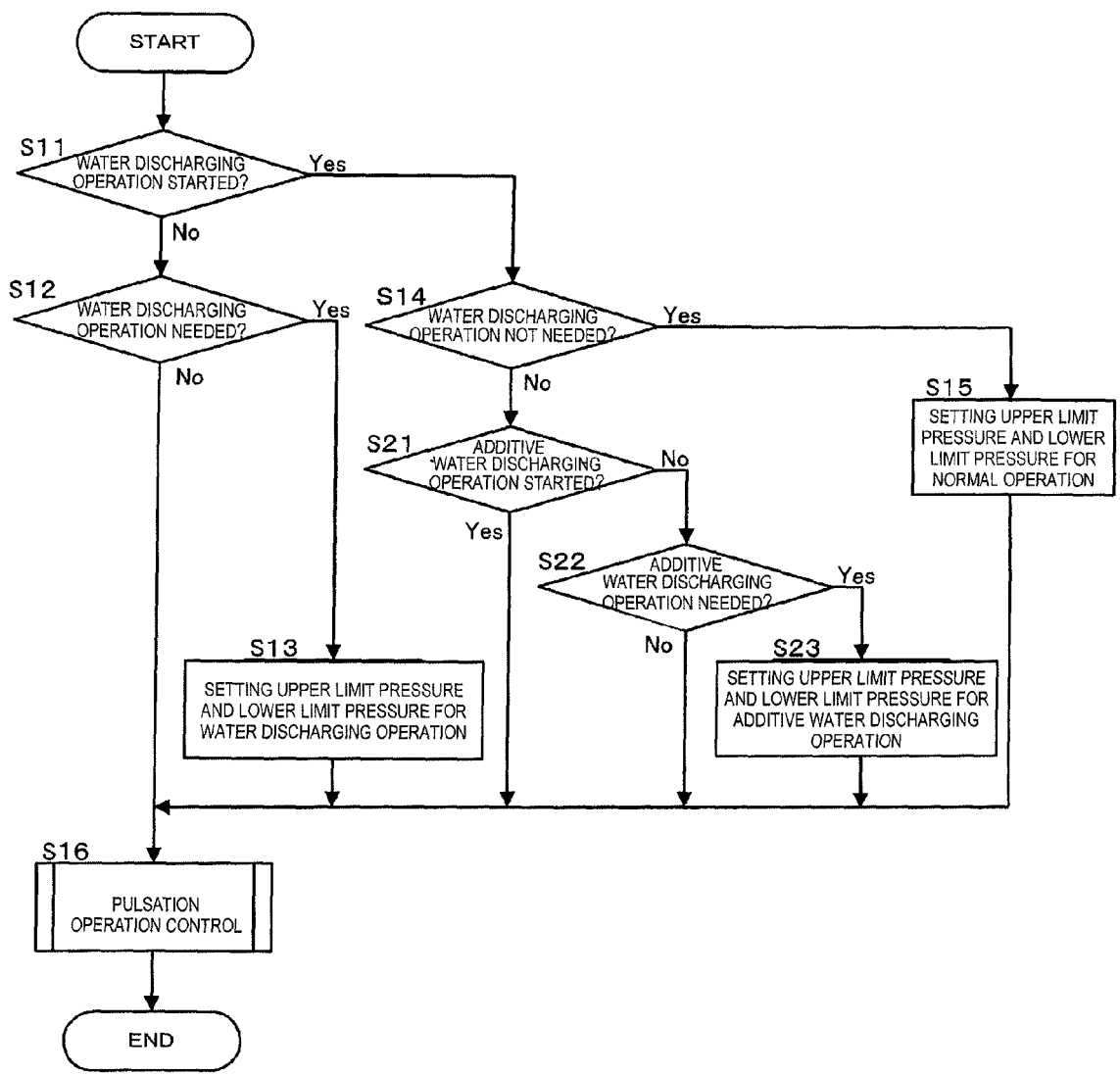
FIG. 12 is a control flow chart executed by the controller in accordance with a second embodiment of the fuel cell system.

FIG. 12 is a flow chart of the control carried out by the controller 600 in accordance with a second embodiment of the fuel cell system 100.

The same reference symbols as those previously used are used here, and they will not be explained in detail again.

For the fuel cell system 100 shown in FIG. 1, together with oxygen $O_2$, the nitrogen $N_2$ in the air also flows back through the electrolyte membrane. Consequently, the oxygen and nitrogen may move to the anode flow path. The nitrogen $N_2$ then stays in the buffer tank 400. In such case, if the pulsation pressure is decreased significantly, the nitrogen $N_2$ may backflow to the anode flow path of the fuel cell stack. As the nitrogen $N_2$ backflows to the anode flow path, the hydrogen partial pressure decreases, and the power generation reaction is hampered.

Here, in the second embodiment, when the water discharging operation should be carried out, the pulsation pressure appears to decrease a little. Even in this case, when the water is not discharged, an additive water discharging operation is carried out. The specifics will be explained in detail below.

Steps S11 to S16 are the same as those in the first embodiment, and they will not be explained in detail again.

In step S21, the controller 600 determines whether the additive water discharging operation is being carried out. If the determination is NO, the process proceeds to step S22. If the determination is YES, the process proceeds to step S16.

In step S22, the controller 600 determines whether an additive water discharging operation is needed. This determination can be carried out as follows: if no water can be discharged after a prescribed time has lapsed from start of the water discharging operation, a determination is made that an additive water discharging operation is needed. If the determination is YES, the process proceeds to step S23. If the determination is NO, the process proceeds to step S16.

In step S23, the controller 600 sets the target upper limit pressure and the target lower limit pressure for the anode pulsation for the additive water discharging operation.

Figure 13:
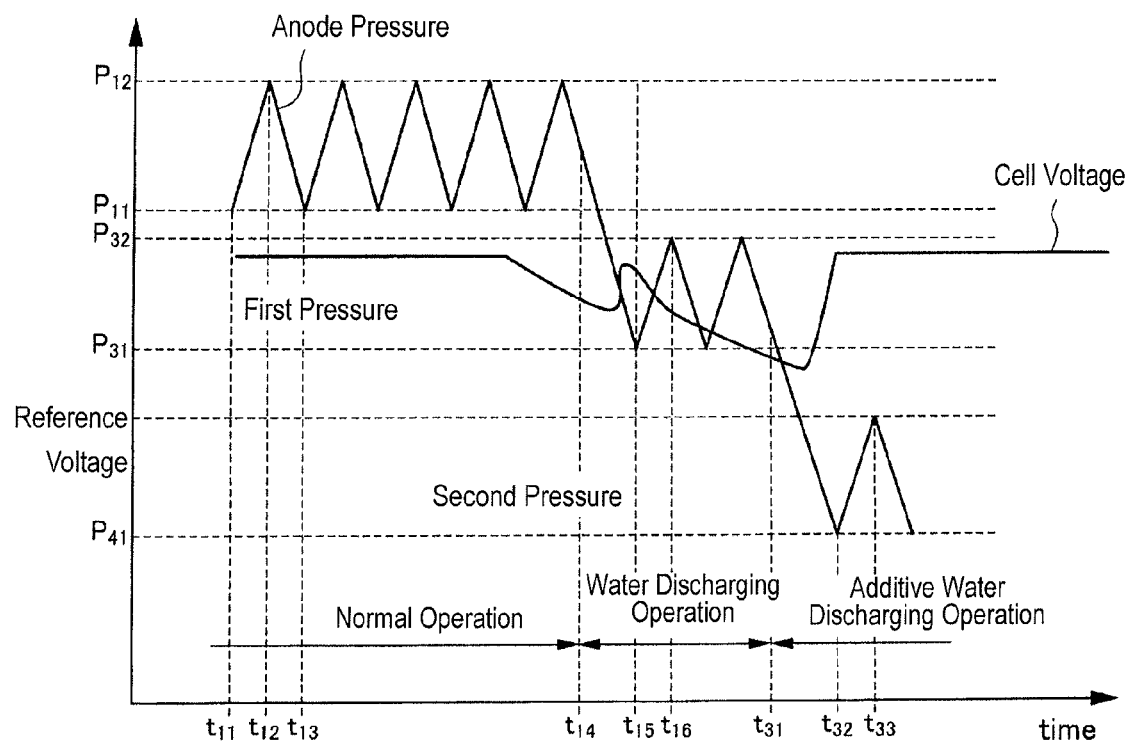
FIG. 13 is a timing chart illustrating the operation when the control flow chart is executed by the controller in accordance with the second embodiment.

FIG. 13 is a timing chart illustrating the operation when the flow chart of the control of the second embodiment is carried out.

The control flow chart described above is executed as follows.

In the first embodiment, if the water discharging operation is carried out from the time t14, the cell voltage recovers. Consequently, according to the second embodiment, even when the water discharging operation is executed from the time $t_{14}$, the cell voltage still does not recover. Here, at the time $t_{31}$, the operation of steps S11→S14→S21→S22→S23 is carried out, and the target upper limit pressure P42 and the target lower limit pressure P41 of the anode pulsation for the additive water discharging operation are set.

After the time $t_{31}$, the operation with the following steps is carried out repeatedly: steps S11→S14→S21→S16→S161→S164. Because the anode gas is consumed due to the power generation reaction even during the period when the supply of the anode gas is turned off, as shown in FIG. 13, the anode pressure keeps decreasing.

If the target lower limit pressure $P_{41}$ is reached at the time $t_{32}$, the operation is carried out as steps S164→S165. As a result, as shown in FIG. 13, the anode pressure increases.

After the time $t_{32}$, the operation of steps S11→S14→S21→S16→S161→S162 is carried out repeatedly. As a result, as shown in FIG. 13, the anode pressure increases.

After the time $t_{33}$, if the anode pressure reaches the target upper limit pressure $P_{42}$, the operation of steps S162→S163 is carried out. As a result, as shown in FIG. 13, the anode pressure decreases.

After the time $t_{33}$, the operation with the following steps is carried out repeatedly: steps S11→S14→S21→S16→S161→S164. Because the anode gas is consumed due to the power generation reaction even during the period when the supply of the anode gas is turned off, as shown in FIG. 13, the anode pressure keeps decreasing.

If the pulsation pressure significantly decreases in a stroke, the nitrogen $N_2$ staying in the buffer tank 400 may backflow to the anode flow path of the fuel cell stack.

Consequently, in the second embodiment, if carrying out the water discharging operation is necessary, the pulsation pressure appears to decrease a little. Even in this case, when water is not discharged, an additive water discharging operation is carried out, so that the backflow of the nitrogen $N_2$ from the buffer tank 400 can be prevented.

If the pulsation pressure is decreased, the output decreases. However, in the second embodiment, as there is no significant decrease in the pulsation pressure in a single stroke, it is possible to keep the decrease in the output power within the smallest possible range.

In the water discharging operation from the time t14 to the time $t_{31}$, the purge valve 500 is controlled so that the purge rate is higher than that in the normal mode. As a result, the anode pressure can be decreased quickly. In addition, in the water discharging operation, the nitrogen $N_2$ can be reliably removed from the buffer tank 400, so that, in the later additive water discharging operation, the nitrogen $N_2$ does not backflow from the buffer tank 400.

Figure 14:
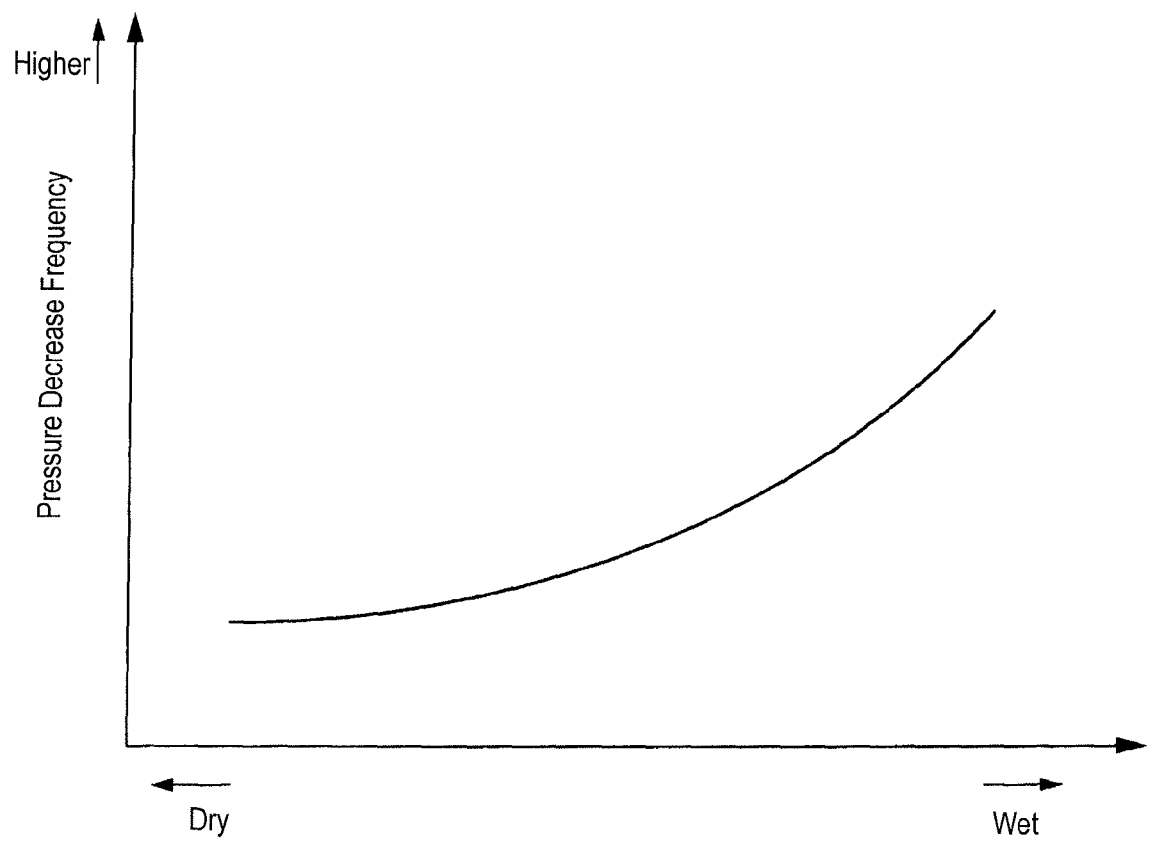
FIG. 14 is a graph illustrating an example of a map for determining a pressure decreasing frequency from a wetness level in accordance with a third embodiment.

In the first and second embodiments, whether the water discharging operation should be carried out is determined on the basis of the actual cell voltage. On the other hand, according to the present embodiment, the water discharging operation is needed once every prescribed period in the pulsation operation. This period may be set constant irrespective of the operation state. In addition, on the basis of the impedance, the wetness of the electrolyte membrane is determined, and the determined wetness is applied on the map shown in FIG. 14, so that when there is less wetness, the frequency of decreasing the pressure is decreased, that is, the period of decreasing the pressure is made longer.

Figure 15:
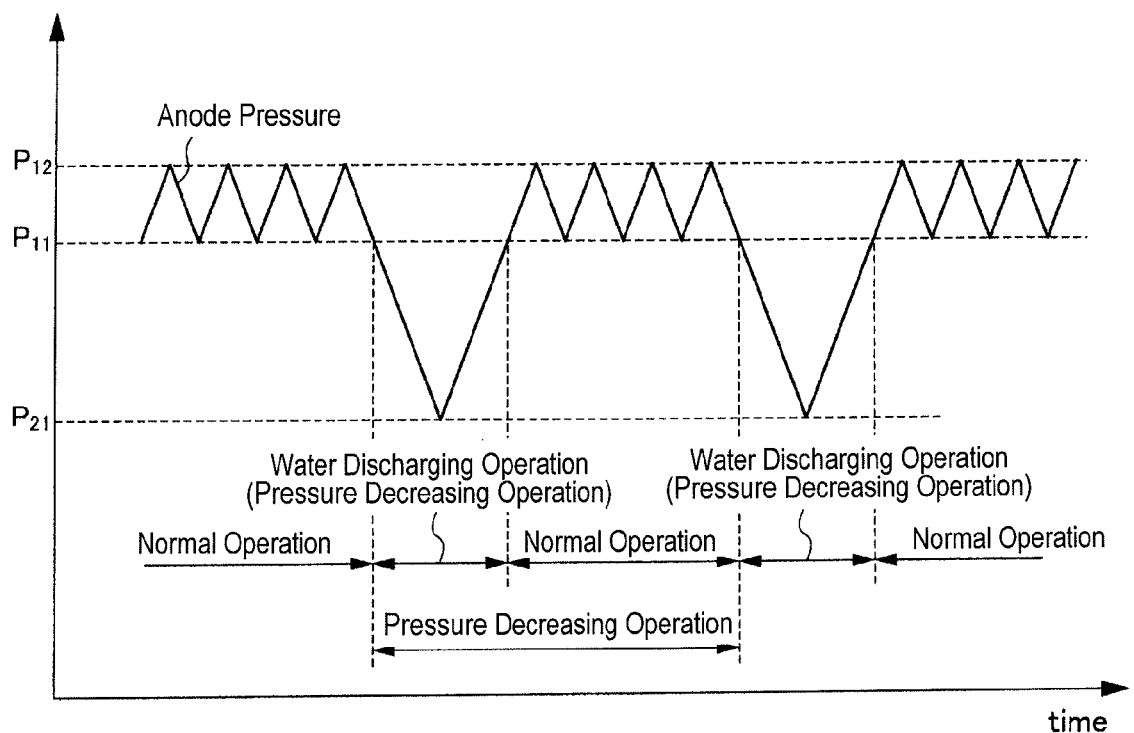
FIG. 15 is a timing chart illustrating the operation of the fuel cell system in accordance with the third embodiment.

According to a third embodiment, as shown in FIG. 15, the water discharging operation is carried out once every prescribed period of the pulsation operation. Consequently, there is no need to detect the actual cell voltage. Consequently, it is possible to simplify the system. Also, when the period of the pulsation operation is set longer when the electrolyte membrane is wetter, that is, when the electrolyte member seems to be wetter, and the settlement is shorter when there is less wetness, that is, when the electrolyte member seems to be drier, and it is possible to prevent the excessive useless execution of the pressure-down operation (the water discharging operation).

In the above, embodiments of the present invention have been explained. However, the embodiments are merely some examples of the present invention, and the technical range of the present invention is not limited to the specific configurations of the embodiments described above.

For example, the embodiments described above may be combined appropriately.

In the above explanation, "detection" is not limited to the direct detection; detection also includes the indirect detection, etc. for determination.

In addition, the pressure adjusting valve explained in the embodiments above may also be controlled as follows.

The upper limit pressure and the lower limit pressure set corresponding to the supply load (the current) of the fuel cells are read from the map. Both the upper limit pressure and the lower limit pressure are higher when the load is greater. At the same time, the greater the load is, the larger the difference in the pressure between the upper limit pressure and the lower limit pressure is.

According to such a map, as the anode pressure becomes that on the greater load side from the lower load, the pulsation width under the high load becomes larger than the pulsation width under the lower load.

When the pressure is increased, the pulsation controller takes the upper limit pressure as the target value, and the pulsation controller controls the pressure feedback by the pressure adjusting valve with reference to the value of the pressure sensor arranged at the anode inlet of the fuel cell stack.

As the actual pressure becomes near the target pressure by the feedback control, the feedback control is carried out again by the pulsation controller, with the lower limit pressure taken as the target pressure.

As this control is carried out repeatedly, the pulsation operation is carried out at the upper limit pressure and the lower limit pressure by the pressure adjusting valve.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cell system comprising
 a fuel cell including an anode that receives an anode gas and a cathode that receives a cathode gas to generate electric power corresponding to a load;
 a pressure adjusting valve disposed in a supply path to adjust anode gas pressure to the anode;
 a purge valve disposed in a discharging flow path to discharge an anode-off gas containing impurities from the fuel cell; and an anode pressure controller programmed to
- control the pressure adjusting valve to perform a pulsation operation that pulsates the anode gas pressure of the fuel cell, and
- decrease a median pressure of the pulsation operation as a wetness level of an electrolyte membrane of a fuel cell stack is determined to become higher.

2. The fuel cell system according to claim 1, wherein the anode pressure controller is programmed to
- set an upper limit pressure of the pulsation operation of the anode gas and a lower limit pressure of the pulsation operation of the anode gas;
- control the pressure adjusting valve so that the anode gas pressure pulsates between the upper limit pressure and the lower limit pressure; and
- decrease the median pressure of the pulsation operation by decreasing the lower limit pressure of the pulsation operation of the anode gas.

3. The fuel cell system according to claim 2, further comprising
an internal resistance detector that detects an internal resistance of the electrolyte membrane of the fuel cell, the anode pressure controller being further programmed to determine the wetness level of the electrolyte membrane of the fuel cell based on the internal resistance of the electrolyte membrane.

4. The fuel cell system according to claim 1, further comprising
a cell voltage detector that detects a cell voltage of the electrolyte membrane of the fuel cell, the anode pressure controller being further programmed to determine the wetness level of the electrolyte membrane of the fuel cell based on the cell voltage.

5. The fuel cell system according to claim 2, wherein the anode pressure controller is programmed to reset the lower limit pressure of the pulsation operation of the anode gas upon determining a water discharging operation is not needed after the lower limit pressure of the pulsation operation of the anode gas was decreased.

6. The fuel cell system according to claim 2, wherein the anode pressure controller is programmed to further decrease the lower limit pressure of the pulsation operation of the anode gas by decreasing the lower limit pressure of the pulsation operation of the anode gas upon determining water cannot be discharged.

7. The fuel cell system according to claim 1, wherein the anode pressure controller is programmed to decrease the median pressure of the pulsation operation of the anode gas when a cell voltage of the fuel cell is lower than a reference level.

8. The fuel cell system according to claim 1, wherein the anode pressure controller is programmed to decrease the median pressure of the pulsation operation once during a prescribed time period.

9. The fuel cell system according to claim 2, wherein the anode pressure controller is programmed to increase a purge rate of the purge valve to decrease the lower limit pressure of the pulsation operation of the anode gas.

10. The fuel cell system according to claim 2, wherein the anode pressure controller is programmed to increase a decreasing magnitude amount of the lower limit pressure of the pulsation operation of the anode gas when a hydrogen concentration of a buffer tank is higher than a predetermined concentration.

11. The fuel cell system according to claim 2, further comprising
an internal resistance detector that detects an internal resistance of the electrolyte membrane of the fuel cell, the anode pressure controller being further programmed to determine the wetness level of the electrolyte membrane of the fuel cell based on the internal resistance of the electrolyte membrane.

12. The fuel cell system according to claim 2, further comprising
a cell voltage detector that detects a cell voltage of the electrolyte membrane of the fuel cell, the anode pressure controller being further programmed to determine the wetness level of the electrolyte membrane of the fuel cell based on the cell voltage.

13. The fuel cell system according to claim 3, wherein the anode pressure controller is programmed to reset the lower limit pressure of the pulsation operation of the anode gas upon determining a water discharging operation is not needed after the lower limit pressure of the pulsation operation of the anode gas was decreased.

14. The fuel cell system according to claim 3, wherein the anode pressure controller is programmed to further decrease the lower limit pressure of the pulsation operation of the anode gas upon determining water cannot be discharged by decreasing the lower limit pressure of the pulsation operation of the anode gas.

15. The fuel cell system according to claim 3, wherein the anode pressure controller is programmed to decrease the median pressure of the pulsation operation of the anode gas when a cell voltage of the fuel cell is lower than a reference level.

16. The fuel cell system according to claim 3, wherein the anode pressure controller is programmed to decrease the median pressure of the pulsation operation once during a prescribed time period.

17. The fuel cell system according to claim 3, wherein the anode pressure controller is programmed to increase a purge rate of the purge valve to decrease the lower limit pressure of the pulsation operation of the anode gas.

18. The fuel cell system according to claim 3, wherein the anode pressure controller is programmed to increase a decreasing magnitude amount of the lower limit pressure of the pulsation operation of the anode gas when a hydrogen concentration of a buffer tank is higher than a predetermined concentration.

* * * * *